United States Patent [19]

McAndrews

[11] Patent Number: 5,934,697
[45] Date of Patent: Aug. 10, 1999

[54] FORK SUSPENSION WITH OIL BATH LUBRICATION

[75] Inventor: Mike McAndrews, Santa Cruz, Calif.

[73] Assignee: Rockshox, Inc., San Jose, Calif.

[21] Appl. No.: 08/759,124

[22] Filed: Dec. 2, 1996

[51] Int. Cl.⁶ .................................................. B62K 25/08
[52] U.S. Cl. ............................................ 280/276; 267/293
[58] Field of Search ..................................... 280/276, 275, 280/283; 188/266, 297; 267/200, 64.11, 292, 293, 64.26

[56] References Cited

U.S. PATENT DOCUMENTS

| | | | |
|---|---|---|---|
| 1,129,560 | 2/1915 | Dougan | 267/64.11 |
| 2,683,034 | 7/1954 | Seddon | 280/276 |
| 2,683,044 | 7/1954 | Seddon . | |
| 2,708,112 | 5/1955 | Seddon . | |
| 2,743,102 | 4/1956 | Seddon . | |
| 4,147,371 | 4/1979 | Morita et al. | 280/276 |
| 4,272,064 | 6/1981 | Katsumori | 267/64.11 |
| 4,278,266 | 7/1981 | Inoue et al. . | |
| 4,408,751 | 10/1983 | Dodson et al. | 267/64.11 |
| 4,718,647 | 1/1988 | Ludwig | 267/120 |
| 4,815,718 | 3/1989 | Kadis | 267/130 |
| 4,971,344 | 11/1990 | Turner | 280/276 |
| 5,044,648 | 9/1991 | Knapp | 280/283 |
| 5,088,705 | 2/1992 | Tsai | 280/284 |
| 5,195,766 | 3/1993 | Dobrmann et al. | 280/276 |
| 5,445,401 | 8/1995 | Bradbury | 280/276 |
| 5,449,189 | 9/1995 | Chen | 280/276 |
| 5,456,480 | 10/1995 | Turner et al. | 280/276 |
| 5,509,677 | 4/1996 | Bradbury | 280/276 |
| 5,580,075 | 12/1996 | Turner et al. | 280/276 |

FOREIGN PATENT DOCUMENTS 585122   2/1947   United Kingdom .

*Primary Examiner*—Anne Marie Boehler
*Attorney, Agent, or Firm*—Skadden, Arps, Slate, Meagher & Flom; David W. Hansen

[57] ABSTRACT

A shock absorbing fork for a bicycle or other two-wheeled vehicle of the type having a pair of telescoping struts, with upper tubes which are interconnected by an upper crown to a steerer tube at an upper end portion thereof and lower tubes which are which mount a wheel axle at a bottom end thereof. Within at least one of the telescoping struts a spring arrangement and/or a hydraulic damping arrangement is provided which is acted upon as the upper tube and the lower tube move toward each other for absorbing impact shocks experienced by the wheel of the bicycle. For shock absorbing forks in which no hydraulic damping arrangement is provided or it is contained within a separate cylinder or cartridge which isolates its hydraulic damping fluid from walls of the telescoping tubes, so that damping fluid cannot be used as a source of lubricant for the telescopic tubes, according to the invention, a predetermined free quantity of liquid lubricant is provided in the bottom of the lower tube in a volume that small enough so as not to be directly acted upon by the upper tube even during maximum (inward) compressive telescoping of the strut, but which is sufficient to migrate along the length of the lower tube without being directly acted upon by the reciprocating motion of the tubes relative to each other.

3 Claims, 5 Drawing Sheets

FORK SUSPENSION WITH OIL BATH LUBRICATION

BACKGROUND OF THE INVENTION

1. Field of the Invention

The present invention relates to a shock absorbing front fork for bicycles. More specifically, the present invention relates to such a bicycle shock absorbing fork having struts with telescoping tubes with a shock absorbing system of a type which either does not include a hydraulic damping arrangement or has a hydraulic damping arrangement of a type in which the hydraulic damping fluid is contained within a separate cylinder or cartridge so as to be isolated from the walls of the telescoping tubes, so that the hydraulic damping fluid cannot be used as a source of lubricant for the telescopic tubes.

2. Description of Related Art

Numerous types of shock absorbing forks have been developed for absorbing the impacts experienced by the front wheel of the bicycle during off-road riding. Typically, these shock absorbing front forks have at least one strut formed of a pair of tubes which telescopically reciprocate with respect to each other under the influence of wheel shocks, and to absorb these shocks and damp the reciprocatory motion of the telescopic tubes, the strut contains a shock absorbing arrangement with or without a separate damping arrangement caused by uneven terrain encountered by the front wheel (see, e.g., U.S. Pat. Nos. 5,445,401 and 5,546,480).

In "high end" forks, hydraulic fluid damping is most commonly utilized in which a valve controls the flow of a hydraulic damping fluid between chambers on opposite sides of a damping piston. In most such hydraulic damping arrangements, the hydraulic fluid containing chambers are formed directly by inner surfaces of the telescopic tubes. Thus, since the damping fluid used is an oil or similar fluid which has the properties of a lubricant, the damping fluid, which is in direct contact tubes walls, is able to also serve to provide lubrication between the inner telescoping tube and the outer telescoping tube, in addition to serving as the damping medium. Examples of such, effectively self-lubricating, hydraulically damped shock absorbing front forks can be found in U.S. Pat. Nos. 4,971,344 and 5,088,705.

However, in many shock-absorbing suspensions for the front wheel of a bicycle, either no hydraulic damping is provided (see, for example, U.S. Pat. Nos. 5,284,352 and 5,470,090) or hydraulic damping is provided by a hydraulic fluid which is contained within a separate cylinder or cartridge. As a result, in the first type, there is no fluid to serve as a lubricant, and in the second case, the hydraulic damping fluid cannot be used as a source of lubricant for the telescopic tubes because it is isolated from the walls of the telescoping tubes. Since such telescoping shock absorbers still require lubrication against effects of the frictional forces between the telescoping members to be reduced, an external lubricant, such as grease, must be applied to the outside of the inner telescoping tube.

This external application of a grease has numerous detrimental effects. First of all, a coating of grease on the outside of the inner telescoping member is quite messy and open to exterior elements, which often results in the rider of the bicycle ending up with grease somewhere on their body if they accidentally brush against the front bicycle fork. Secondly, the grease wears off over time through extended use of the shock absorbers, and the grease needs to be reapplied to retain proper lubrication. Furthermore, since the grease is exposed to exterior elements, dirt and other contaminants stick to the grease and decrease its functional lubricating characteristics.

It is noted that telescopic motor vehicle compression springs are known (U.S. Pat. No. 2,683,034) where a reservoir of lubricating fluid is arranged to as to be dynamically loaded when an elastomeric compression spring is subjected to compression loading, thereby resulting in the lubricating fluid being forced out of the reservoir and distributed along the length of the elastomeric compression spring. Once the dynamic load is removed, excess oil is squeezed out of the lubricating channel, back to the reservoir. However, the arrangement of this patent is not applicable to the type of suspension described above in which hydraulic damping is provided by a hydraulic fluid which is contained within a separate cylinder or cartridge. Moreover, the presence of an incompressible fluid in the path of movement of the rigid body of such a cylinder or cartridge would produce a hydraulic locking of the telescoping tubes when the cylinder or cartridge dynamically engages the fluid.

Thus, a need exists for a way to avoid having to externally apply lubricants in shock absorbing front forks which are not of a self-lubricating type.

SUMMARY OF THE INVENTION

Therefore, it is a primary object of the present invention to overcome the aforementioned shortcomings associated with externally applied lubricants in shock absorbing front forks which are not of a self-lubricating type.

In keeping with the foregoing object, it is also primary object of the present invention to provide a shock absorbing front fork for a bicycle in which a small quantity of a lubricating liquid, separate from any such fluid which may exist for damping purposes, is disposed with a lower tube of the telescopic strut in a way which adequately lubricates the surfaces between the telescoping members.

These as well as additional objects and advantages of the present invention are achieved by providing a shock absorbing fork for a bicycle of the type having a pair of telescoping struts, with upper tubes which are interconnected by an upper crown to a steerer tube at an upper end portion thereof and lower tubes which mount a wheel axle at a bottom end thereof. Within at least one of the telescoping struts, a spring arrangement and/or a hydraulic damping arrangement is provided which is acted upon as the upper tube and the lower tube move toward each other for absorbing impact shocks experienced by the wheel of the bicycle. For shock absorbing forks in which no hydraulic damping arrangement is provided or it is contained within a separate cylinder or cartridge which isolates its hydraulic damping fluid from walls of the telescoping tubes, so that damping fluid cannot be used as a source of lubricant for the telescopic tubes, according to the invention, a predetermined quantity of liquid lubricant is provided in the bottom of the lower tube in a volume that small enough so as not to be directly acted upon by the upper tube even during maximum (inward) compressive telescoping of the strut, but which is sufficient to migrate along the length of the lower which is traversed by the upper telescoping tube, the lubricating liquid being distributed between the upper and lower tubes indirectly as a result of the reciprocating motion of the tubes relative to each other without dynamic loading of the liquid.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
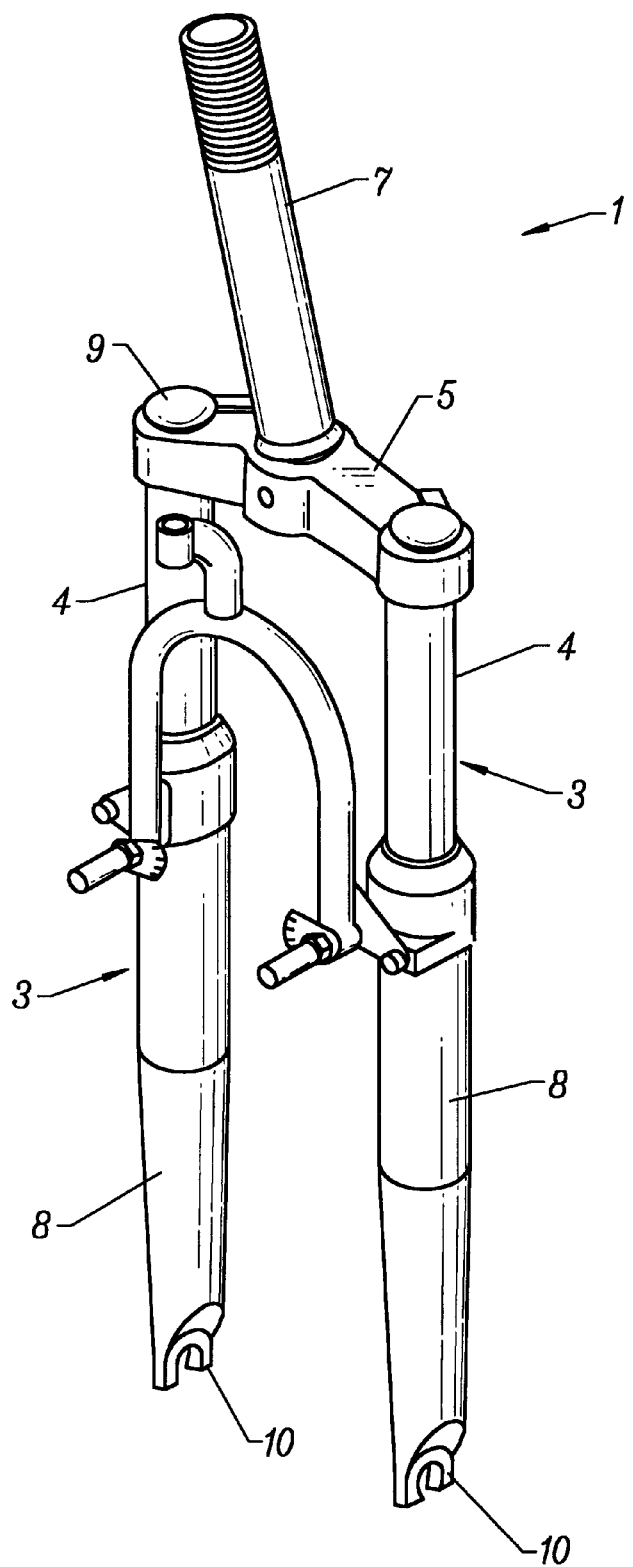
FIG. 1 is a perspective view of a front fork for a bicycle of the type into which the shock absorbing system in accordance with the present invention is incorporated.

FIG. 1 shows a shock absorbing front fork 1 for a bicycle of the type having a pair of telescoping struts 3, upper tubes 4 of which are interconnected by an upper crown 5 to a steerer tube 7 at their upper ends. Lower tubes 8 of struts 3 telescopically receive the upper tubes 4 in an upper end thereof, and have mounting brackets 10 to which an axle of a bicycle front wheel (not shown) is attached at their bottom ends.

Figure 2:
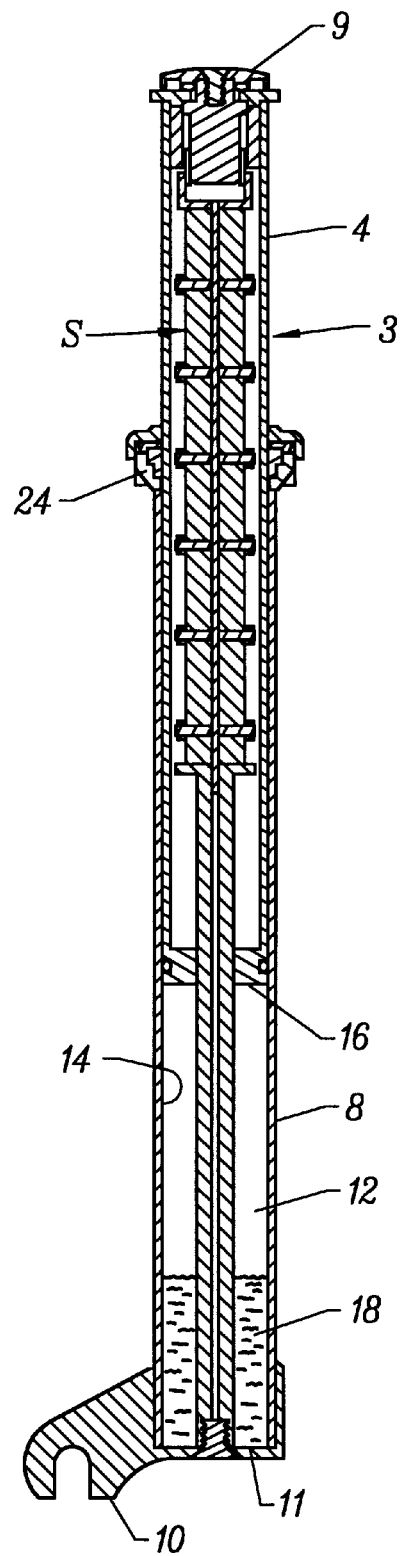
FIG. 2 is a cross-sectional side view of one strut of a fork without hydraulic damping, to which the present invention has been applied.

As illustrated in FIG. 2, each of the lower tubes 8 has a variable volume chamber 12 defined therein between bottom end 11 of the lower tube 8 and bottom end 16 of upper tube 4 and peripherally bounded by the inner 14 of the lower tube 8. When the wheel carrier by mounts 10 is subjected to, e.g., an impact due to engagement with a rock or hole, telescopic motion of the upper tube 4 into the lower tube 8 is produced compressing one or more spring elements S (while a stack series of elastomeric pads is shown, a single elastomeric column, one or more coil type springs, or other known compression spring arrangements may be used as a shock absorbing unit for the strut 3) which function to absorb these shocks encountered by the bicycle front wheel. This reciprocating motion between the upper tube 4 and the lower tube 8 changes the volume of the chamber 12. That is, as telescoping strut 3 compresses to absorb shock, the bottom end 16 of upper tube 4 travels toward the bottom end 11 of lower tube 8, thus reducing the volume of chamber 12. Similarly, when the telescoping strut 3 expands to return to its neutral position, the bottom end 16 of upper tube 4 travels away from the bottom end 11 of lower tube 8, thus increasing the volume of chamber 12.

A liquid lubricating medium 18, such as oil or the like, is contained within chamber 12 to provide lubrication, and thus reduce the friction, between the upper tube 4 and lower tube 8 during their reciprocating motion. As can be seen from the figures, the maximum amount of lubricant 18 provided within chamber 12 is smaller in volume than the minimum volume of the variable volume of chamber 12, i.e., the volume of chamber 12 when the strut 3 is fully compressed with the bottom end 16 of upper tube 4 having reached its furthermost point within lower tube 8. The minimum quantity of lubricant 18 should be sufficient to coat the inner wall 8a of the lower tube 8 with a film of lubricant while still leaving a pooled reserve at the bottom of lower tube 8 to allow the vaporizing of the lubricant 18, that occurs when the fork is in its dynamic state, to continue. Thus, generally, a volume of lubricant that is slightly greater than the volume defined by the difference between the outer diameter of the upper tube 4 and the inner diameter of the lower tube 8 multiplied by the stroke length that the upper tube 4 is able to reciprocate within lower tube 8 should be sufficient.

The lubricant can be disposed within chamber 12 most easily by doing so with the tubes of the strut 3 assembled but with the shock absorbing unit at least partially removed from the strut. For example, typically, the spring elements are insertable and removable through the open top end of the upper strut 4, which is closed by a top cap 9 that serves to preload the spring element(s) S as well as to keep foreign matter out of the inside of strut 3. Thus, with the cap 9 removed, prior to installation of the spring elements S (or in the case of applying the invention to an existing fork, after at least partial removal of thereof), the correct quantity of oil can be poured into the strut 3, after which the spring element(s) S shock absorbing unit can be secured within the strut with the cap 9 fixed in place. However, in some cases, as for a fork of the type having a self-containing hydraulic damping unit as described below relative to FIG. 7, it may be necessary to add the lubricant to the lower tube with the upper tube out of the lower tube.

Figures 3, 4:
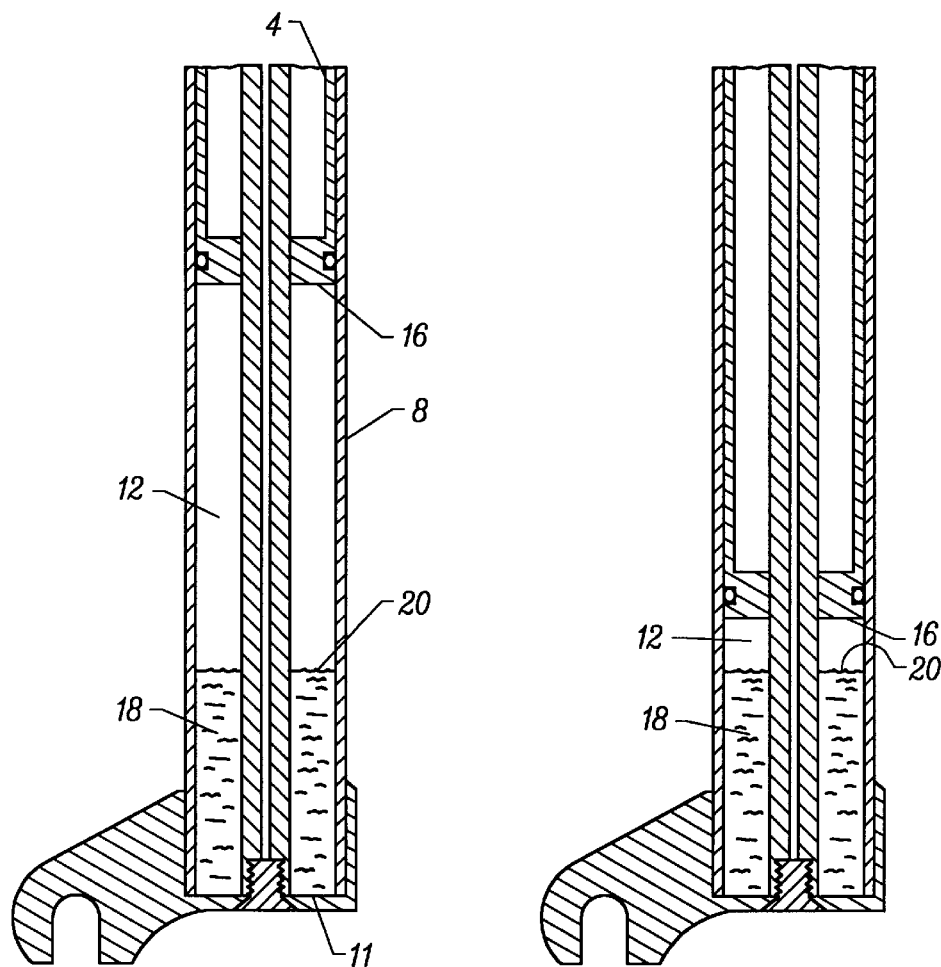
FIG. 3 is a cross-sectional side view of a portion of the FIG. 2 strut of the present invention showing the strut in an expanded position.
FIG. 4 is an enlarged cross-sectional side view of a portion of the FIG. 2 strut of the present invention showing the strut in a fully compressed position.

Referring now to FIGS. 3 and 4, the relationship between the volume of the lubricant 18 and the volume of chamber 12 will be described in greater detail. FIG. 3 illustrates the strut 3 in its normal resting position, where it can be seen that the bottom end 16 of upper tube 4 is situated a predetermined distance from an upper surface 20 of lubricant 18. When the strut 3 becomes fully compressed, the bottom end 16 of upper tube 4 travels toward the upper surface 20 of the lubricant 18, as shown in FIG. 4; but, even at the furthestmost point within lower tube 8 which the bottom end 16 of upper tube 4 reaches, the bottom end 16 remains above the height of the upper surface 20 of lubricant 18. As a result, on the one hand, the lubricant 18 does not provide any shock absorbing or vibration damping function, and on the other hand, the compression stroke of the telescoping strut 3 is not prematurely terminated due to engagement the bottom 16 of the upper tube 4 with the lubricant 18 which is substantially incompressible by the amount of force exerted on a bicycle front fork 1. Therefore, the volume occupied by lubricant 18 in chamber 12 will always be less than the minimum volume of the variable volume chamber 12 itself.

Since the reciprocating motion of the telescoping strut 3 provides the shock absorbing and vibration damping characteristics for the bicycle front fork 1, it is necessary for the lubricant 18 to travel between inner surface 14 of lower tube 8 and the outer surface of upper tube 4 to allow the telescoping strut 3 to retain its functional reciprocating characteristics by providing proper lubrication in this area. The lubricant 18 is distributed between inner surface 14 of lower tube 8 and the outer surface of upper tube 4 from the location the reservoir of lubricant 18 in chamber 12 indirectly by the reciprocating motion between the upper tube 4 and the lower tube 8. The lubricant 18 is indirectly distributed due to numerous effects resulting from the reciprocating motion as well as from splashing due to the bumps and impacts to which the fork is subjected during riding and which cause the fork to compress. First of all, the reciprocating motion between the upper tube 4 and the lower tube 8 generates heat in the telescoping strut 3 due the friction between the telescoping tubes 4 and 8. Secondly, as described above, as the telescoping strut 3 is compressed, the volume of chamber 12 is decreased which compresses the air present in chamber 12. When upper tube 4 retracts and returns to its resting position, the combined effect resulting from the heat generated and the compressed air produces a suction effect which draws the lubricant 18 upward. Lubricant 18 reaching the travel area of the upper tube 4 within the lower tube 16, it is drawn upward along the length of the lower tube as the telescoping strut 3 expands. Repeated compression and expansion of the strut 3 will lead to the lubricant being spread over the facing surfaces of the telescoping tubes 4, 8, having migrated all the way up to the top end 22 of lower tube 8, where a seal 24 is situated between the upper tube 4 and lower tube 8 to prevent escape of the lubricant 18 from within the strut 3.

Figures 5, 6:
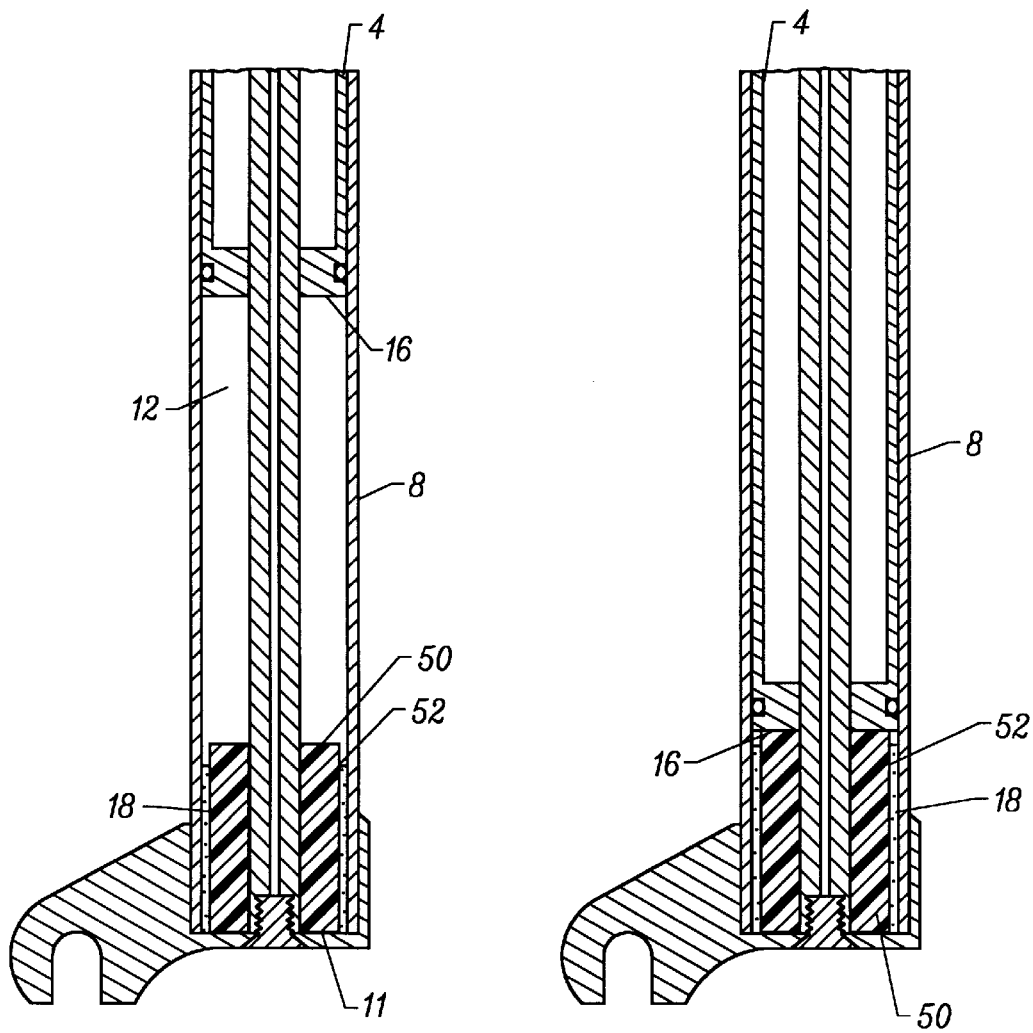
FIG. 5 is an enlarged cross-sectional side view corresponding to that of FIG. 3, but in which a rebound bumper is shown disposed at the bottom of the lower tube.
FIG. 6 is an enlarged cross-sectional side view corresponding to FIG. 4, but in which a rebound bumper is shown disposed at the bottom of the lower tube.

Referring now to FIGS. 5 and 6, an alternative preferred embodiment of the present invention is illustrated having a stop elastomer 50 positioned in lower tube 8 adjacent to bottom end 11. When the bicycle wheel experiences a large and sudden bump, it is possible for hypercompression to occur and for the bottom end 16 of the upper tube 4 to travel an excessive distance into lower tube 8. The stop elastomer 50 provides a positive cushioned stop to prevent the bottom end 16 of upper tube 8 from smashing into the bottom end 11 of lower tube 8 which may result in serious injury to the rider. However, upper tube 8 must encounter the stop elastomer 50 prior to encountering the top surface 52 of the lubricant 18, since, as described above, the lubricant 18 is usually substantially incompressible and could similarly cause serious injury to the rider if encountered first. Therefore, the amount of lubricant provided in chamber 12 should be such that the height of the stop elastomer 50, at its fully-loaded, compressed height remains above the height of the top surface 52 of the lubricant 18, so that the bottom end 16 of upper tube 4 will encounter stop elastomer 50 prior to encountering the top surface 52 of lubricant 18 during hypercompression, as can be seen from FIG. 6. Aside from including stop elastomer 50, the embodiment of the present invention shown in FIGS. 5 and 6 is otherwise functionally equivalently to the previous embodiments described above with regard to distributing lubricant 18 between upper tube 4 and lower tube 8.

Figure 7:
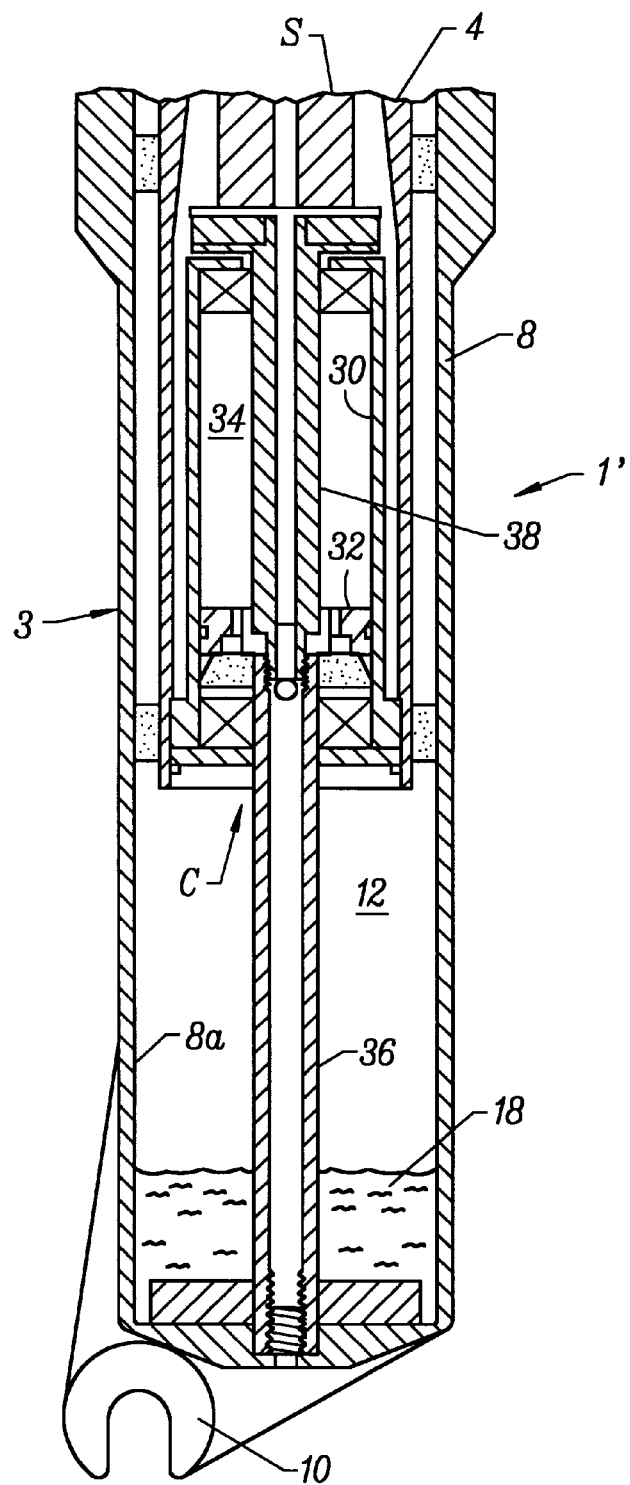
FIG. 7 shows the invention applied to the strut of a hydraulically damped, shock absorbing front fork.

FIG. 7 shows application of the invention to a cartridge-type fork 1' as is known from U.S. Pat. No. 5,546,480, referred to above. To avoid the need to describe of details thereof, this patent is hereby incorporated by reference and only general aspects thereof which are related to the present invention will be described.

In fork 1', a hydraulic fluid containing cartridge C is mounted within the strut 3 with it hollow body 30 removably secured within the bottom end of the upper tube 4. The cartridge body 30 defines a cylinder space 34 which contains hydraulic fluid and a valved piston 32 which acts on it, piston 32 being shown in its position which occurs upon maximum expansion of the strut 3, i.e., with variable volume chamber 12 at its maximum volume. Piston 32 is connected by a shaft 36, which passes through the bottom wall of the cartridge C in a sealed manner, to the bottom of the lower tube 8 and carries a rod 38 which passes through the upper end of the cartridge body 30 and supports at least one spring element S which is preloaded from above. As the strut 3' is compressed, upper tube 4, and with it cartridge body 30 moves downward, leading to compression of spring element (s) S movement of damping fluid from the upper side of the piston 32 to the lower side.

As with the other embodiments, the lubricant 18 is not contacted at maximum compression of the fork, and thus, plays no role in the shock absorbing function of the spring element(s) S or in the damping function of the hydraulic cartridge C. Migration of the lubricant 18 also occurs as described above. In a commercially available fork of this type as is sold by the assignee of the present application under the trademark JUDY® (which has an upper tube with an outer diameter of about 1 inch, an inner tube with an outer diameter of about 1.25 inch, and a stroke length of 2.6 inches), a volume of 10–15 cc has been found to be suitable in tests applying the present invention thereto. Furthermore, in such a fork, the lower tube 8 is formed of magnesium, the upper tube is formed of aluminum, a steel/bronze/lead bushing acts between them. With such a combination of materials, a corrosive reaction can occur, and the lubrication provided in accordance with the present invention has been found to also prevent such a reaction from occurring.

While various embodiments in accordance with the present invention have been shown and described, it is understood that the invention is not limited thereto, and is susceptible to numerous changes and modifications as known to those skilled in the art. Firstly, while the above-described embodiments relate to a front fork, they can easily be adapted for use with a fork for a rear wheel. Furthermore, it should be appreciated that, while the above embodiments have been described for use in bicycle shock absorbing struts of particular types, it is apparent that the present invention may be utilized in any shock absorber having telescoping members and which either does not include a hydraulic damping arrangement or has a hydraulic damping arrangement of a type in which the hydraulic damping fluid is contained within a separate cylinder or cartridge so as to be isolated from the walls of the telescoping tubes, so that the hydraulic damping fluid cannot be used as a source of lubricant for the telescopic tubes, including those intended, for example, for motocross type motorcycles.

Therefore, this invention should not be viewed as being limited to the details shown and described herein. Instead, this invention includes all such changes and modifications as are encompassed by the scope of the appended claims.

What is claimed is:

1. A shock absorbing fork for a two-wheeled vehicle having a pair of telescoping struts, with upper tubes which are interconnected by an upper crown to a steerer tube at an upper end portion thereof and lower tubes which have means for mounting a wheel axle at a bottom end thereof, and a shock absorbing unit acting between the upper and lower tube in at least one of said struts, comprising:

a self-contained hydraulic damping unit comprising a cylinder body disposed within said lower tube between an inner bottom end of said lower tube and an outer lower end of said upper tube;

a chamber formed within said cylinder body of said self-contained hydraulic damping unit, said chamber having a volume which decreases as said upper tube and said lower tube telescopically compress toward each other and which increases as said upper tube and said lower tube telescopically expand away from each other; and a free quantity of lubricant provided within said chamber in a volume which is smaller than a minimum volume of said chamber occurring when said upper tube and said lower tube are fully compressed toward each other as a means for providing lubrication between said upper tube and said lower tube;

wherein said lubricant has a volume which is slightly greater than a volume defined by the difference between an outer diameter of said upper tube and an inner diameter of said lower tube multiplied by a stroke length that said upper tube is able to reciprocate within said lower tube, said lubricant volume being sufficient to coat an inner wall of said lower tube and still leave a pooled reserve of lubricant in said chamber to allow vaporizing of said fluid to occur in a dynamic state of said fork.

2. A shock absorbing fork for a two-wheeled vehicle having a pair of telescoping struts, with upper tubes which are interconnected by an upper crown to a steerer tube at an upper end portion thereof and lower tubes which have means for mounting a wheel axle at a bottom end thereof, and a shock absorbing unit acting between the upper and lower tube in at least one of said struts, comprising:

a chamber formed within said lower tube, between an inner bottom end of said lower tube and an outer lower end of said upper tube, said chamber having a volume which decreases as said upper tube and said lower tube telescopically compress toward each other and which increases as said upper tube and said lower tube telescopically expand away from each other; and a free quantity of lubricant provided within said chamber in a volume which is smaller than a minimum volume of said chamber occurring when said upper tube and said lower tube are fully compressed toward each other as a means for providing lubrication between said upper tube and said lower tube;

wherein said lubricant has a volume which is slightly greater than a volume defined by the difference between an outer diameter of said upper tube and an inner diameter of said lower tube multiplied by a stroke length that said upper tube is able to reciprocate within said lower tube.

3. Method of lubricating a shock absorbing fork for a two-wheeled vehicle having a pair of telescoping struts, with upper tubes which are interconnected by an upper crown to a steerer tube at an upper end portion thereof and lower tubes which have means for mounting a wheel axle at a bottom end thereof, and a shock absorbing unit acting between the upper and lower tube in at least one of said struts, and having a chamber formed within said lower tube, between an inner bottom end of said lower tube and an outer lower end of said upper tube, said chamber having a volume which decreases as said upper tube and said lower tube telescopically compress toward each other and which increases as said upper tube and said lower tube telescopically expand away from each other, comprising the step of disposing a free quantity of lubricant within said chamber with said strut being in at least a partially disassembled state, and then fully assembling the strut; wherein said free quantity of lubricant has a volume which is smaller than a minimum volume of said chamber occurring when said upper tube and said lower tube are fully compressed toward each other as a means for providing lubrication between said upper tube and said lower tube without affecting telescopic compression of said strut, and wherein said lubricant is disposed in said chamber in a volume which is slightly greater than a volume defined by the difference between an outer diameter of said upper tube and an inner diameter of said lower tube multiplied by a stroke length that said upper tube is able to reciprocate within said lower tube.

* * * * *